(12) United States Patent
Huang

(10) Patent No.: US 11,314,156 B2
(45) Date of Patent: Apr. 26, 2022

(54) LIGHT SOURCE SYSTEM AND PROJECTION DEVICE USING SAME

(71) Applicants: HONG FU TAI PRECISION ELECTRONS CO., LTD., Yantai (CN); HON HAI PRECISION INDUSTRY CO., LTD., New Taipei (TW)

(72) Inventor: Shi-Kai Huang, New Taipei (TW)

(73) Assignees: HONG FU TAI PRECISION ELECTRONS (YANTAI) CO., LTD., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 17/026,614

(22) Filed: Sep. 21, 2020

(65) Prior Publication Data

US 2021/0356851 A1 Nov. 18, 2021

(30) Foreign Application Priority Data

May 14, 2020 (CN) .......................... 202010409023.3

(51) Int. Cl.
| | |
|---|---|
| *G03B 21/20* | (2006.01) |
| *F21V 9/08* | (2018.01) |
| *F21K 9/64* | (2016.01) |
| *F21Y 113/13* | (2016.01) |

(52) U.S. Cl.
CPC .............. *G03B 21/204* (2013.01); *F21K 9/64* (2016.08); *F21V 9/08* (2013.01); *F21Y 2113/13* (2016.08)

(58) Field of Classification Search
None
See application file for complete search history.

(56) References Cited

U.S. PATENT DOCUMENTS

| | | | |
|---|---|---|---|
| 2003/0142241 A1* | 7/2003 | Allen | H04N 9/3114 348/742 |
| 2005/0206855 A1* | 9/2005 | Hori | H04N 9/3114 353/84 |

* cited by examiner

*Primary Examiner* — Michelle M Iacoletti
*Assistant Examiner* — Danell L Owens
(74) *Attorney, Agent, or Firm* — ScienBiziP, P.C.

(57) ABSTRACT

A lighting system and a projection device with enhanced functionality includes a light source in the lighting system for emitting first light, a first wavelength selection structure, and a second wavelength selection structure. The first wavelength selection structure includes a wavelength selection portion for transmitting the first light in a first target wavelength and a first light-transmitting portion for transmitting the first light. The light emitted then from the first wavelength selection structure is defined as second light. The second wavelength selection structure receives the second light and applies a supplementary portion for transmitting the second light in a second target wavelength and a second light-transmitting portion for transmitting the light. The light emitted from the second wavelength selection structure is adjustable as to colors, as to low or high color saturation, and as to low or high brightness of the projection image.

17 Claims, 5 Drawing Sheets

LIGHT SOURCE SYSTEM AND PROJECTION DEVICE USING SAME

FIELD

The subject matter herein generally relates to lighting for projection, specifically a light source system and a projection device using the light source system.

BACKGROUND

A projection system generally includes a light source and a wavelength conversion element. The light source emits monochromatic light. After passing through the wavelength conversion element, the monochromatic light is converted into light of at least two colors. The two colors of light can be modulated to form projection images.

The colors of light into which the monochromatic light can be converted depends on the structure of the wavelength conversion element. When the structure of the wavelength conversion element is determined, the color of the light that is emitted from the wavelength conversion element in the projection system is also determined. As a result, the projection images displayed by the projection system have a very restricted display effect.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
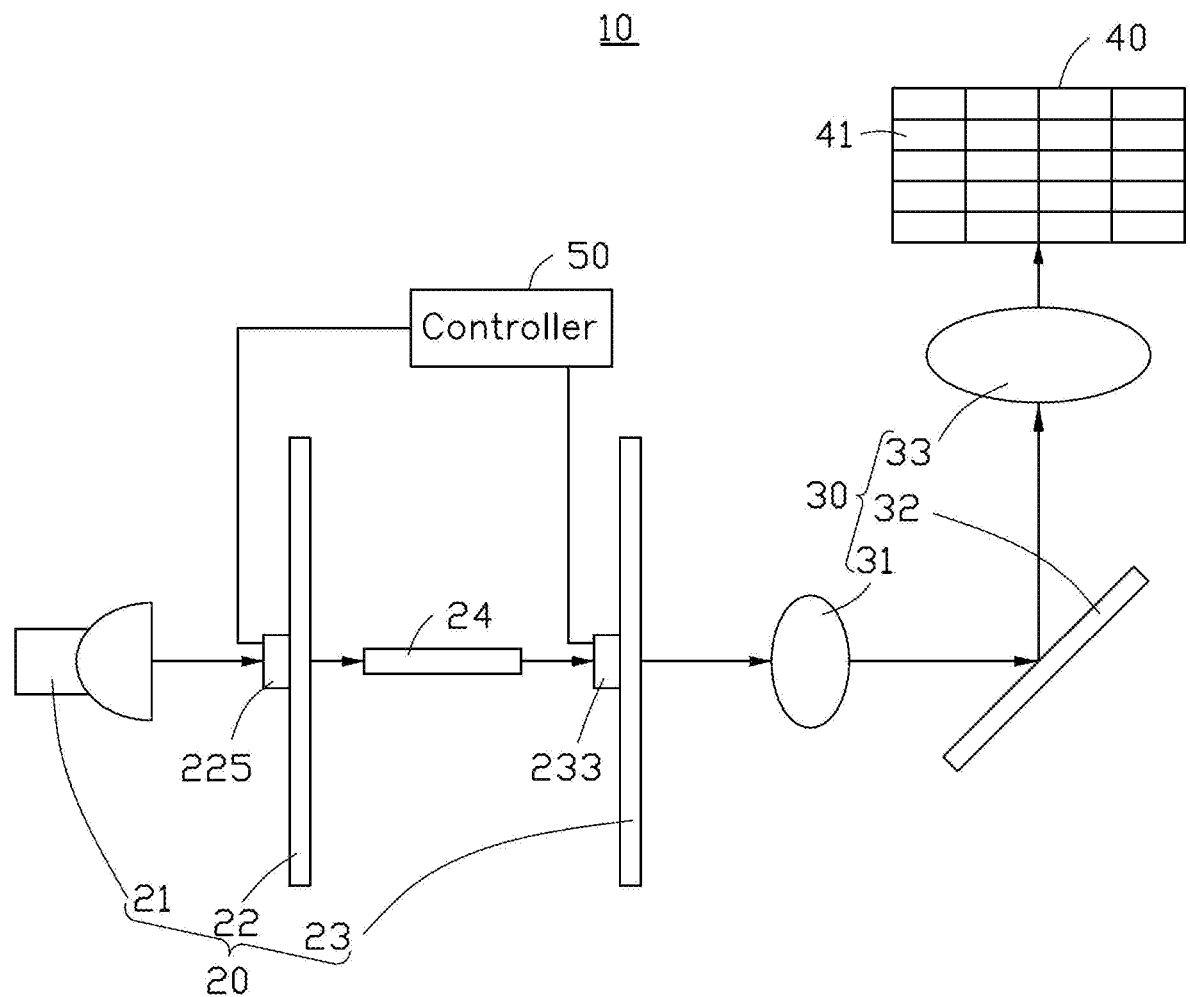
FIG. 1 is a schematic diagram of a projection device according to an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one".

FIG. 1 shows a projection device 10 according to an embodiment. The projection device 10 is configured for displaying projection images. In one embodiment, the projection device 10 is a projector.

The projection device 10 includes a light source system 20, a light guiding element 30, and a light modulator 40. The light source system 20 is the source for emitting light. The light guiding element 30 is on an output path of the source light and guides the source light to the light modulator 40. The light modulator 40 modulates the source light to display the projection image.

The light source system 20 includes a light source 21, a first wavelength selection structure 22, a second wavelength selection structure 23, and a light pipe 24.

The light source 21 emits a first light, the first light is white light. In one embodiment, the light source 21 is a high-pressure mercury lamp of high brightness and strong in projecting light. In other embodiments, the light source 21 may be other types of light sources for emitting white light.

Figure 2:
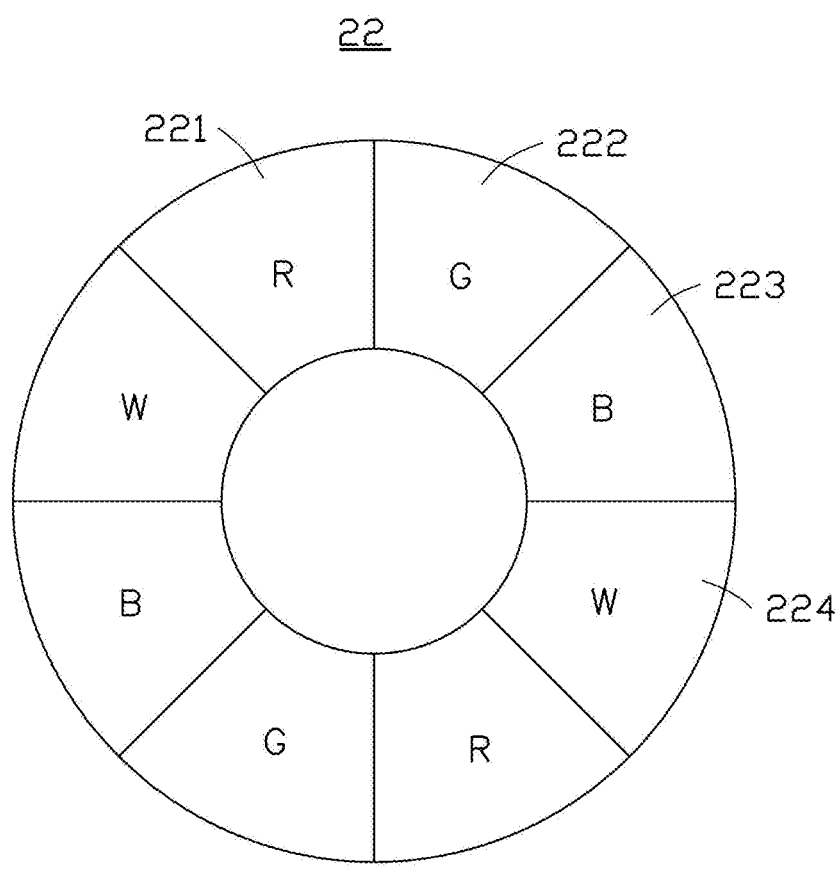
FIG. 2 is a schematic diagram of a first wavelength selection structure according to an embodiment.

FIG. 2 shows a first wavelength selection structure 22 according to an embodiment. The first wavelength selection structure 22 is a disc-shaped color wheel and is capable of rotating around its center (not shown) under the driving of a motor 225. In other embodiments, the first wavelength selection structure 22 may have other shapes, and other displacement methods may be adopted. For example, the first wavelength selection structure 22 may have a square or irregular shape and may have non-axial movements in certain directions.

The first wavelength selection structure 22 includes at least one wavelength selection portion for transmitting the first light in a first target waveband and at least one first light-transmitting portion 224 configured for transmitting the first light. In one embodiment, the wavelength selection portion may be a first wavelength selection portion 221 for transmitting the first light in a red-light waveband and filtering out the first light in other wavebands. The wavelength selection portion may be a second wavelength selection portion 222 for selectively transmitting the first light in a green-light waveband and filtering out the first light in other wavebands, or may be a third wavelength selection portion 223 for selectively transmitting the first light in a blue-light waveband and filtering out the first light in other wavebands. That is, the first target waveband may be a red-light waveband, a green-light waveband, or a blue-light waveband.

In one embodiment, the quantities of each first, second, and third wavelength selection portions 221-223, and the first light-transmitting portions 224 in the first wavelength selection structure 22 are two. The first, second, and third wavelength selection portions 221-223, and the first light-transmitting portions 224 are each a sector of a circle with a same central angle. The first, second, and third wavelength selection portions 221-223, and the first light-transmitting portions 224 form a circular ring.

In FIG. 2, the sequence of sectors of the first, second, and third wavelength selection portions 221-223, and the first light-transmitting portions 224 is one first wavelength selection portion 221, then one second wavelength selection portion 222, one third wavelength selection portion 223, one first light-transmitting portion 224, one first wavelength selection portion 221, one second wavelength selection portion 222, one wavelength selection portion 223, and one first light-transmitting portion 224.

In one embodiment, each of the first, second, and third wavelength selection portions 221-223 is a filter. Each of the first light-transmitting portions 224 is a lens.

In one embodiment, when the first wavelength selection structure 22 is used, it rotates clockwise at a constant speed, so that each of the first, second, and third wavelength selection portions 221-223 and the first light-transmitting portions 224 is periodically on the output path of the first light. When the first light is incident on each of the first wavelength selection portions 221, the first wavelength selection structure 22 emits red light. When the first light is incident on each of the second wavelength selection portions 222, the first wavelength selection structure 22 emits green light. When the first light is incident on each of the third wavelength selection portions 223, the first wavelength selection structure 22 emits blue light. When the first light is incident on each of the first light-transmitting portions 224, the first wavelength selection structure 22 emits white light.

Therefore, each of first, second, and third wavelength selection portions 221-223, and the first light-transmitting portions 224 can cause and emit light of different colors. As the first wavelength selection structure 22 rotates, each of first, second, and third wavelength selection portions 221-223, and the first light-transmitting portions 224 is periodically on the output path of the first light, so that the first wavelength selection structure 22 periodically emits red light, green light, blue light, and white light. The light which is emitted from the first wavelength selection structure 22 is defined as second light. That is, in one embodiment, the second light may be red light, green light, blue light, or white light.

In other embodiments, the quantities, the center angle of each sector, the sequence of sectors of the first, second, and third wavelength selection portions 221-223, and the first light-transmitting portions 224 in the first wavelength selection structure 22 can each be adjusted according to different applications and needs. The rotation direction and rotation speed of the first wavelength selection structure 22 can also be adjusted according to different applications and needs. For example, the sequence of sectors of the first, second, and third wavelength selection portions 221-223, and the first light-transmitting portions 224 may be one first wavelength selection portion 221, one third wavelength selection portion 223, one second wavelength selection portion 222, one first light-transmitting portion 224, one first wavelength selection portion 221, one third wavelength selection portion 223, one second wavelength selection portion 222, and one first light-transmitting portion 224. In one embodiment, the center angle of each of the first wavelength selection portions 221 is the largest of all so as to increase the intensity of red light in each frame of image and improve the display effect.

Figure 3:
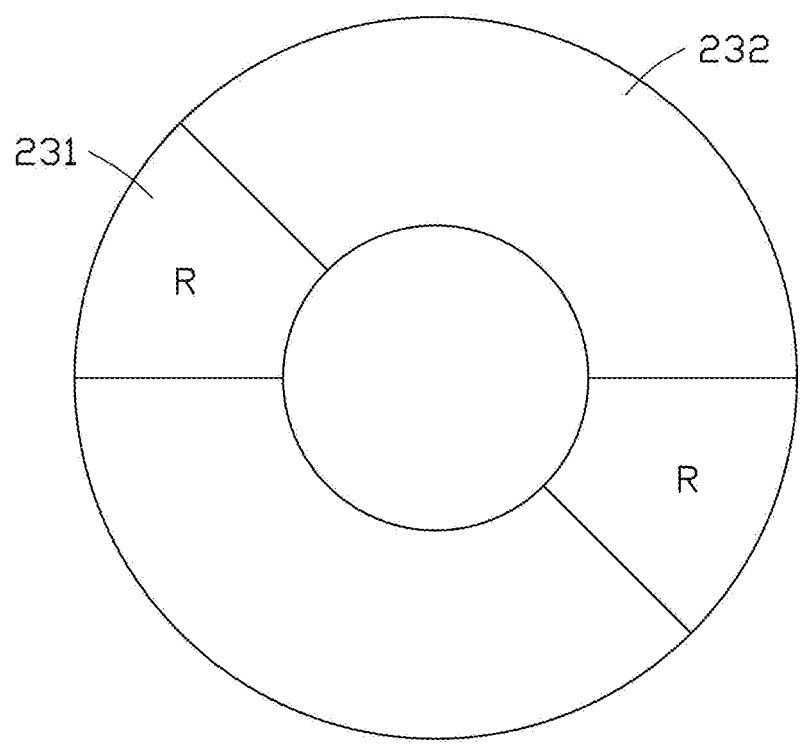
FIG. 3 is a schematic diagram of a second wavelength selection structure according to an embodiment.

FIG. 3 shows a second wavelength selection structure 23 according to an embodiment. The second wavelength selection structure 23 is a disc-shaped color wheel capable of rotating around its center (not shown) under the driving of a motor 233. In other embodiments, the second wavelength selection structure 23 may have other various shapes, and other means of movement may be adopted. For example, the second wavelength selection structure 23 may have a square or irregular shape and may be moved along a certain direction other than around a single axis.

The second wavelength selection structure 23 includes at least one supplementary portion 231 and at least one second light-transmitting portion 232.

In FIG. 3, the second wavelength selection structure 23 includes two supplementary portions 231 and two second light-transmitting portions 232. The supplementary portions 231 and the second light-transmitting portions 232 are a sector of a circle. The central angles of the sector of each supplementary portion 231 are the same. The central angles of the sectors of the second light-transmitting portions 232 are the same. The center angle of the sector of each second light-transmitting portion 232 is three times that of each supplementary light portion 231. Each supplementary light portion 231 has the same central angle and sector size as the first, second, and third wavelength selection portions 221-223 and the first light-transmitting portions 224. The two supplementary portions 231 and the two second light-transmitting portions 232 form a circular ring.

In FIG. 3, the sequence of sectors of the two supplementary portions 231 and the two second light-transmitting portions 232 is one supplementary portion 231, one second light-transmitting portion 232, one supplementary portion 231, and one second light-transmitting portion 232. That is, each supplementary portion 231 alternates with one second light-transmitting portion 232.

In one embodiment, each of the supplementary portions 231 is a filter. Each supplementary portion 231 receives the second light emitted from the first wavelength selection structure 22, transmits the second light in a second target waveband and filters out the second light in other wavebands. In one embodiment, the second target waveband is the red-light waveband. That is, each supplementary portion 231 is used to transmit light in the red-light waveband and filter out the light in the other wavebands. The central angle of each supplementary light portion 231 and each first wavelength selection portion 221 is equal. In one embodiment, each second light-transmitting portion 232 is a lens for receiving and transmitting the second light emitted from the first wavelength selection structure 22.

In one embodiment, when the second wavelength selection structure 23 is used, it rotates clockwise at a constant speed, so that each of the supplementary portions 231 and the second light-transmitting portions 232 is periodically on the output path of the second light.

If the second light is red light, when the second light is incident on each supplementary portion 231, each supplementary portion 231 emits red light, and when the second light is incident on each second light-transmitting portion 232, each second light-transmitting portion 232 also emits red light.

If the second light is green light, when the second light is incident on each supplementary portion 231, since there is no red light in the green light waveband, the supplementary portion 231 does not emit light, and when the second light is incident on each second light-transmitting portion 232, each second light-transmitting portion 232 emits green light.

If the second light is blue light, when the second light is incident on each supplementary portion 231, since there is no red light in the blue-light waveband, the supplementary portion 231 does not emit light, and when the second light is incident on each second light-transmitting portion 232, each second light-transmitting portion 232 emits blue light.

If the second light is white light, when the second light is incident on each supplementary portion 231, the supplementary portion 231 only selects and transmits light in the red-light waveband and filters out the rest of the white light. When the second light enters the second light-transmitting portion 232, the second light-transmitting portion 232 emits white light. In one embodiment, the light emitted from the second wavelength selection structure 23 is defined as source light.

As shown in FIG. 1, the light pipe 24 is between the first wavelength selection structure 22 and the second wavelength selection structure 23, and concentrates and guides the light emitted from the first wavelength selection structure 22 to the second wavelength selection structure 23.

The projection images displayed by the projection device 10 can be obtained by modulating the red light, blue light, and green light. In one embodiment, the first wavelength selection structure 22 not only emits red light, green light, and blue light through the first, second, and third wavelength selection portions 221-223, but also emits white light through the first light-transmitting portions 224. When white light is incident on each supplementary portion 231, each supplementary portion 231 emits red light. The amount of red light in the source light is thus increased. When white light is incident on each second light-transmitting portion 232, each second light-transmitting portion 232 emits white light. The amount of white light in the source light is thus increased.

Therefore, the projection image is modulated by controlling the red light emitted by the first wavelength selection unit 221, the green light emitted by the second wavelength selection unit 222, and the blue light emitted by the third wavelength selection unit 223. In addition, where the white light emitted from the first wavelength selection structure 22 is incident on the second wavelength selection structure 23, the light is also controlled in respect of the color of the added light. For example, red light can be added when the white light is incident on the supplementary portions 231, and white light can be added when the white light is incident on the second light-transmitting portion 232.

As shown in FIG. 1, the projection device 10 includes a controller 50. The controller 50 electrically connects the motor 225 and the motor 233 to control the rotation of the first wavelength selection structure 22 and the second wavelength selection structure 23.

The projection device 10 works in multiple display modes. In one embodiment, the projection device 10 can operate in a time-division manner for a high color saturation display mode and a high brightness display mode.

Figure 4:
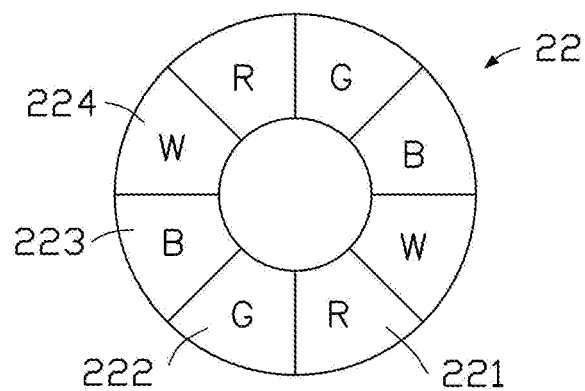
FIG. 4 is a schematic diagram of the first wavelength selection structure and the second wavelength selection structure when the projection device is operating in a high color saturation display mode.
Figure 4:
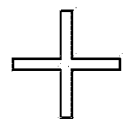
Figure 4:
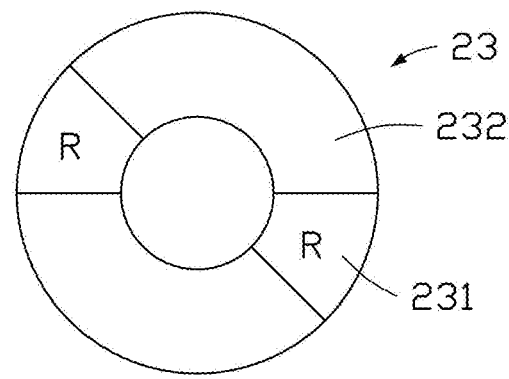
Figure 4:
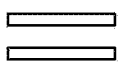
Figure 4:
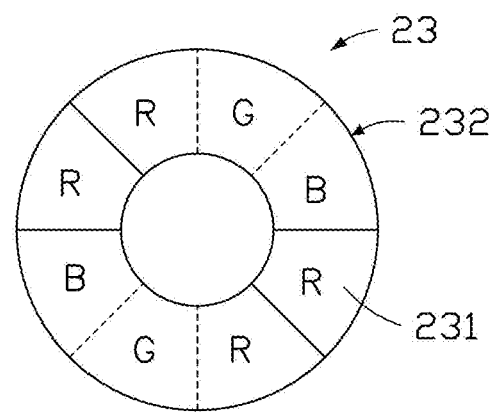

FIG. 4 shows the first wavelength selection structure 22 and the second wavelength selection structure 23 when the projection device 10 is working in the high color saturation display mode. When the projection device 10 so operates, more red light is obtained from the source light.

As mentioned above, when the white light emitted from the first wavelength selection structure 22 enters the supplementary portions 231, the amount of red light is increased. On the first wavelength selection structure 22, white light is emitted from the two first light-transmitting portions 224. Therefore, when the projection device 10 operates in the high color saturation display mode, the controller 50 controls the first wavelength selection structure 22 and the second wavelength selection structure 23 so that each of the first light-transmitting portions 224 on the first wavelength selection structure 22 is aligned with one of the supplementary portions 231 on the second wavelength selection structure 23. That is, during the entire rotation process, along a thickness direction of the second wavelength selective structure 23, a projection of each first light-transmitting portion 224 on the second wavelength selection structure 23 completely overlaps with one of the supplementary portions 231 (i.e., the projection of each first light-transmitting portion 224 on the second wavelength selection structure 23 coincides with one of the supplementary portions 231), so that the light emitted from each first light-transmitting portion 224 is incident on one of the supplementary portions 231.

Each supplementary portion 231 receives white light emitted from one of the first light-transmitting portions 224 and transmits only the red-light waveband of the white light. That is, each supplementary portion 231 effectively emits red light. The light of other colors (such as, red light, green light, and blue light) emitted from the first wavelength selection structure 22 are all transmitted through the second light-transmitting portions 232 of the second wavelength selection structure 23. Therefore, the proportion of red light in the light emitted from the second wavelength selection structure 23 is significantly increased.

Since the proportion of red light is increased, the color saturation of the source light is also increased, improving the image display of the projection device 10.

Figure 5:
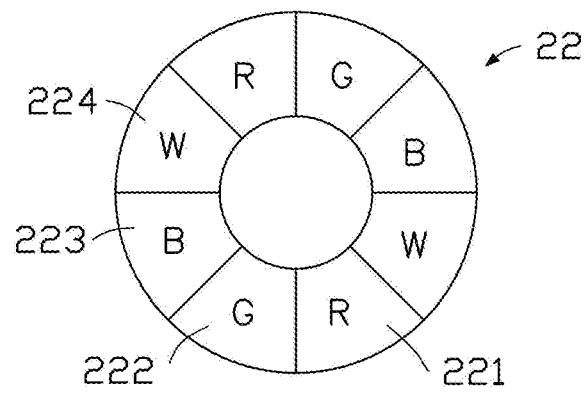
FIG. 5 is a schematic diagram of the first wavelength selection structure and the second wavelength selection structure when the projection device is working in a high-brightness display mode.
Figure 5:
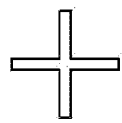
Figure 5:
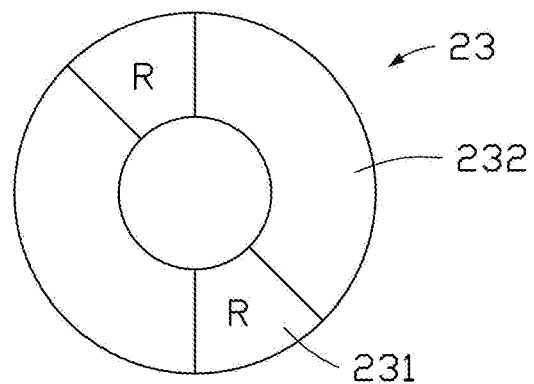
Figure 5:
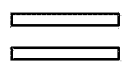
Figure 5:
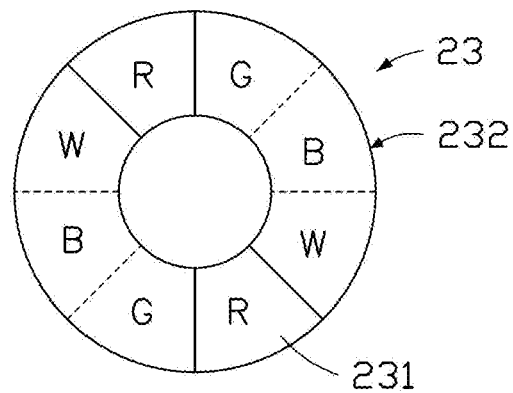

FIG. 5 shows the first wavelength selection structure 22 and the second wavelength selection structure 23 when the projection device 10 is working in the high brightness display mode. When the projection device 10 so works, more white light is obtained from the source light. As mentioned above, if the second light is white light, the second wavelength selection structure 23 emits white light only when the second light is incident on the second light-transmitting portions 232. When the white light emitted from the first wavelength selection structure 22 enters the second light-transmitting portions 232, the proportion of white light is increased. On the first wavelength selection structure 22, white light is emitted from the two first light-transmitting portions 224.

Therefore, when the projection device 10 operates in the high brightness display mode, the controller 50 controls the first wavelength selection structure 22 and the second wavelength selection structure 23 so that a projection of each first light-transmitting portion 224 on the second wavelength selection structure 23 falls into one of the second light-transmitting portions 232. Light emitted from each first light-transmitting portion 224 is made incident on one of the second light-transmitting portions 232. Each second light-transmitting portion 232 directly transmits white light emitted from one of the first light-transmitting portions 224. That is, each second light-transmitting portion 232 emits white light. The proportion of white light is increased.

In one embodiment, if the second light is blue light or green light, and the second light is incident on the supplementary portion 231, the supplementary portion 231 does not emit any light. If the second light is red light, the supplementary portion 231 allows the second light to be transmitted. In order to not affect the image display, when the projection device 10 is operating in the high-brightness display mode, the controller 50 also controls the first wavelength selection portions 221 on the first wavelength selection structure 22 and the supplementary portions 231 on the second wavelength selection structure 23 to be aligned one on one. That is, during the entire rotation process, the projection of each first wavelength selection portion 221 on the second wavelength selection structure 23 completely overlaps with the supplementary portion 231, and the red light emitted from each first wavelength selection portion 221 enters one of the supplementary portions 231. Each supplementary portion 231 directly transmits the red light emitted from one of the first wavelength selection portions 221.

Since the projection of each first wavelength selection portion 221 on the second wavelength selection structure 23 completely overlaps with the supplementary portion 231, the projection of each second wavelength selection portion 222 and each third wavelength selection portion 223 on the second wavelength selection structure 23 enters the second light-transmitting portion 232. Each supplementary portion 231 emits red light, and each second light-transmitting portion 232 emits green light, blue light, or white light.

The red light, green light, and blue light of the source light emitted from the second wavelength selection structure 23 are modulated to form projection images. By adding white light, the brightness of the source light is increased, thereby improving the brightness of the projection images.

In one embodiment, as shown in FIG. 1, the light guiding element 30 includes a first collecting lens 31, a reflecting mirror 32, and a second collecting lens 33. The first collecting lens 31, the reflecting mirror 32, and the second collecting lens 33 are arranged in sequence between the second wavelength selection structure 23 and the light modulator 40. The first collecting lens 31 receives the light emitted from the second wavelength selection structure 23 and emits the light to the reflecting mirror 32 in parallel. The reflecting mirror 32 reflects the parallel light emitted from the first collecting lens 31 to the second collecting lens 33. The light is collimated by the second collection lens 33 and then enters the light modulator 40.

In one embodiment, the types, the quantities, and the combination of optical devices in the light guiding element 30 can each be adjusted according to different applications and needs, as long as the source light emitted from the light source system 20 can be guided to the light modulator 40. The optical devices may be, for example, a lens, a reflection sheet, a zone coating sheet, and the like.

In one embodiment, the source light emitted from the light source system 20 directly enters the light modulator 40. That is, the light guiding element 30 is not required in the projection device 10.

As shown in FIG. 1, the light modulator 40 is a digital micro-mirror array including digital micro-mirrors 41. Each of the digital micro mirrors 41 is used to modulate the source light on a pixel-by-pixel basis. By adjusting the rotation angle or opening time of each digital micro-mirror 41, the intensity of the light after passing through each digital micro-mirror 41 is controlled. The source light is modulated by the digital micro mirrors 41 and is emitted as the projection image.

In the projection device 10 and the light source system 20, the controller 50 controls the rotation of the first wavelength selection structure 22 and the second wavelength selection structure 23 to control the colors of the light projected, so as to meet different requirements of the projection device 10 for source lighting in different display modes.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A light source system, comprising:
a light source configured for emitting a first light, the first light being white light;
a first wavelength selection structure on an output path of the first light, wherein the first wavelength selection structure comprises at least one wavelength selection portion configured for selectively transmitting the first light in a first target waveband and at least one first light-transmitting portion configured for transmitting the first light, the at least one wavelength selection portion and the at least one first light-transmitting portion are periodically on the output path of the first light, the light emitted from the first wavelength selection structure is defined as a second light; and
a second wavelength selection structure on an output path of the second light, wherein the second wavelength selection structure comprises at least one supplementary portion configured for selectively transmitting the second light in a second target waveband and at least one second light-transmitting portion configured for transmitting the second light, the at least one supplementary portion and the at least one second light-transmitting portion are time-divisionally located on an output path of the light transmitted from the at least one first light-transmitting portion, the light emitted from the second wavelength selection structure is source light configured for displaying images;
wherein the first wavelength selection structure and the second wavelength selection structure are color wheels;
wherein the first wavelength selection structure comprises two first wavelength selection portions, two second wavelength selection portions, two third wavelength selection portions, and two first light-transmitting portions; the two first wavelength selection portions, the two second wavelength selection portions, the two third wavelength selection portions, and the two first light-transmitting portions form a circular ring;
wherein the second wavelength selection structure comprises two supplementary portions and two second light-transmitting portions; each of the two supplementary portions and each of the two second light-transmitting portions is a sector of a circle;
the two supplementary portions and the two second light-transmitting portions form a circular ring.

2. The light source system according to claim 1, wherein the second target waveband is a red-light waveband.

3. The light source system according to claim 1, wherein
the two first wavelength selection portions configured for selectively transmitting the first light in a red-light waveband;
the two second wavelength selection portions configured for selectively transmitting the first light in a green-light waveband; and
the two third wavelength selection portions configured for selectively transmitting the first light in a blue-light waveband.

4. The light source system according to claim 3, wherein
the first wavelength selection structure rotates so that the two first wavelength selection portions, the two second wavelength selection portions, the two third wavelength selection portions, and the two first light-transmitting portions are periodically on the output path of the first light;
the second wavelength selection structure rotates so that the two supplementary portions and the two second light-transmitting portions are time-divisionally located on the output path of the light transmitted from the at least two first light-transmitting portions.

5. The light source system according to claim 4, wherein the center angle of each of the two second light-transmitting portions is three times the center angle of each of the two supplementary portions, and the central angle of each of the two supplementary portions is equal to the central angle of each of the two first wavelength selection portions, each of the two second wavelength selection portions, each of the two third wavelength selection portions, and each of the two first light-transmitting portions.

6. The light source system according to claim 3, wherein along a thickness direction of the second wavelength selective structure, a projection of each of the two first wavelength selection portions on the second wavelength selection structure coincides with one of the two supplementary portions, so that the light emitted from each of the two first wavelength selection portions is incident on one of the two supplementary portions.

7. The light source system according to claim 3, wherein along a thickness direction of the second wavelength selective structure, a projection of each of the two first light-transmitting portions on the second wavelength selection structure falls into one of the two second light-transmitting portions, so that the light emitted from each of the two first light-transmitting portions is incident on one of the two second light-transmitting portions.

8. The light source system according to claim 1, wherein each of the two first wavelength selection portions, each of the two second wavelength selection portions, each of the two third wavelength selection portions and each of the two first light-transmitting portions is a sector of a circle with a same central angle.

9. A projection device, comprising:
a light source system comprising:
a light source configured for emitting a first light, the first light being white light;
a first wavelength selection structure on an output path of the first light, wherein the first wavelength selection structure comprises at least one wavelength selection portion configured for selectively transmitting the first light in a first target waveband and at least one first light-transmitting portion configured for transmitting the first light, the at least one wavelength selection portion and the at least one first light-transmitting portion are periodically on the output path of the first light, the light emitted from the first wavelength selection structure is defined as a second light; and
a second wavelength selection structure on an output path of the second light, wherein the second wavelength selection structure comprises at least one supplementary portion configured for selectively transmitting the second light in a second target waveband and at least one second light-transmitting portion configured for transmitting the second light, the at least one supplementary portion and the at least one second light-transmitting portion are time-divisionally located on an output path of the light transmitted from the at least one first light-transmitting portion, the light emitted from the second wavelength selection structure is source light configured for displaying images;
a light modulator configured for modulating the source light into the projection images; and
a controller connected to the first wavelength selection structure and the second wavelength selection structure, wherein the controller is configured for controlling displacement of the first wavelength selection structure and the second wavelength selection structure, so that the projection device works in different display modes;
wherein the first wavelength selection structure and the second wavelength selection structure are color wheels;
wherein the first wavelength selection structure comprises two first wavelength selection portions, two second wavelength selection portions, two third wavelength selection portions, and two first light-transmitting portions; the two first wavelength selection portions, the two second wavelength selection portions, the two third wavelength selection portions, and the two first light-transmitting portions form a circular ring;
wherein the second wavelength selection structure comprises two supplementary portions and two second light-transmitting portions; each of the two supplementary portions and each of the two second light-transmitting portions is a sector of a circle;
the two supplementary portions and the two second light-transmitting portions form a circular ring.

10. The projection device according to claim 9, wherein the second target waveband is a red-light waveband.

11. The projection device according to claim 9, wherein
the two first wavelength selection portions configured for selectively transmitting the first light in a red-light waveband;
the two second wavelength selection portions configured for selectively transmitting the first light in a green-light waveband; and
the two third wavelength selection portions configured for selectively transmitting the first light in a blue-light waveband.

12. The projection device according to claim 11, wherein the first wavelength selection structure rotates so that the two first wavelength selection portions, the two second wavelength selection portions, the two third wavelength selection portions, and the two first light-transmitting portions are periodically on the output path of the first light;
the second wavelength selection structure rotates so that the two supplementary portions and the two second light-transmitting portions are time-divisionally located on the output path of the light transmitted from the two first light-transmitting portions.

13. The projection device according to claim 11, wherein along a thickness direction of the second wavelength selective structure, a projection of each of the two first wavelength selection portions on the second wavelength selection structure coincides with one of the two supplementary portions, so that the light emitted from each of the two first wavelength selection portions is incident on one of the two supplementary portions.

14. The projection device according to claim 11, wherein along a thickness direction of the second wavelength selective structure, a projection of each of the two first light-transmitting portions on the second wavelength selection structure falls into one of the two second light-transmitting portions, so that the light emitted from each of the two first light-transmitting portions is incident on one of the two second light-transmitting portions.

15. The projection device according to claim 9, wherein each of the two first wavelength selection portions, each of the two second wavelength selection portions, each of the two third wavelength selection portions and each of the two first light-transmitting portions is a sector of a circle with a same central angle.

16. The projection device according to claim 15, wherein the center angle of each of the two second light-transmitting portions is three times the center angle of each of the two supplementary portions, and the central angle of each of the two supplementary portions is equal to the central angle of each of the at two first wavelength selection portions, each of the two second wavelength selection portions, each of the two third wavelength selection portions, and each of the two first light-transmitting portions.

17. The projection device according to claim 9, further comprising a light guiding element on an output path of the source light, wherein the light guiding element is configured for receiving and guiding the source light to the light modulator.

* * * * *